(12) United States Patent
Chainani (10) Patent No.: US 6,247,661 B1
(45) Date of Patent: Jun. 19, 2001

(54) SPICE GRINDER AND DISPENSER (76) Inventor: Ramesh L. Chainani, 49 Stonecroft La., Amherst, NY (US) 14226

( * ) Notice: Subject to any disclaimer, the term of this patent is extended or adjusted under 35 U.S.C. 154(b) by 0 days.

(21) Appl. No.: 09/541,655

(22) Filed: Apr. 3, 2000

(51) Int. Cl.[7] .................................................. A47J 42/04
(52) U.S. Cl. ...................................................... 241/169.1
(58) Field of Search ................................ 271/168, 169.1, 271/169.2

(56) References Cited

U.S. PATENT DOCUMENTS 4,632,322 * 12/1986 Beilstein ........................ 241/169.1
4,960,246 * 10/1990 Fohrman ........................ 241/169.1

* cited by examiner

Primary Examiner—Mark Rosenbaum (57) ABSTRACT

A combined spice grinder and storage container cap assembly is disclosed, which is detachably mounted to an open end of a standard storage container, the assembly has ground spice storage area and contains a raw spice grinder interposed between the raw spice contained in the storage container and the ground spice storage area, and further contains a flow selector cap means for capping and/or dispensing ground spices from the holding area in selected flow patterns and volume.

8 Claims, 7 Drawing Sheets

SPICE GRINDER AND DISPENSER

This invention relates to a combination grinder and dispenser which is conveniently removably attachable to storage containers such as open mouth bottles and the like, which are used as standard containers for packaging and distribution of spices such as pepper and the like. The combination grinder and dispenser provides a convenient means for the user to grind a larger particle size stored product to a smaller particle size on an as needed basis to assure a fresh ground spice as may be desired.

BACKGROUND OF THE INVENTION

In the practice of the culinary arts, it desirable to enhance the taste experience by flavoring foods with measured quantities of spices of exacting taste. The populace has become more adept at combining various spices and recognizing the subtle differences between fresh ground spices and stored ground spices, with more and more people requesting and requiring the use of fresh ground spices in the preparation of foods.

A common implement in the kitchen is a pepper grinder, typically a single purpose device purchased for the sole purpose of grinding large kernels of pepper, generally referred to as pepper corn, into fresh ground smaller particles. The device is periodically filled from bulk or the like purchases of commonly available pepper corn and comprises a grinding means proximate an outlet to allow ground pepper to escape from the outlet as it is being ground. In use the device must be inverted so the open end faces downward and the pepper corn rests on the grinder, in a manner such that when the grinder is activated the large kernels of pepper engage the grinder and ground pepper falls through the outlet by gravity flow. Implements of this nature are generally manufactured using expensive metal parts and are generally intended to be refillable and reusable, thus requiring the purchase of bulk spices and tedious refilling of the device.

One modern device comprises a simple commercially available standard container having a threaded opening to which a molded plastic grinder mounts. Again, in use the device must be inverted so the open end faces downward and the pepper corn rests on the grinder, in a manner such that when the grinder is activated the large kernels of pepper engage the grinder and ground pepper falls through the outlet by gravity flow. The molded plastic grinder has appeal in that though it is only suitable for grinding limited amounts of spice, it can be so inexpensively manufactured that it is an insignificant cost increase to provide the grinder as an alternate to standard caps used on standard storage containers generally used for marketing and sale of large kernel spices.

Unfortunately, the manner in which the foregoing devices must be operated, e.g. inverted free flow through the outlet while grinding, though suitable in circumstances where one person is observing and controlling the quantity being applied to the food while another is grinding, is generally not convenient for the use by a cook, and certainly limiting for ascertaining the exacting quantities desired by many for the proper flavoring of food. In short, the time honored tradition of applying a "pinch" of pepper, or other spice is difficult if not impossible to measure using a free flow grinder, as is the typical measure of amounts by sight on the open hand of a traditional cook.

It is an object of the present invention to provide an inexpensive molded plastic grinding means suitable for grinding limited amounts of spices.

It is another object of the present invention to provide an inexpensive molded plastic grinding means suitable for replacing capping means on standard storage containers.

It is a further object of the present invention to provide a means for grinding spices, which stores small quantities of ground spices for later use.

These and other objects of the invention will be apparent from the following description of the invention.

SUMMARY OF THE INVENTION

In its most general embodiment, the present invention comprises a combined grinding and dispensing assembly arranged for threaded mounting to an open end of a mating threaded storage container, the assembly comprising a grinding means, a temporary holding area for storing ground spices and a flow selector cap means for capping and/or dispensing ground spices from the holding area in selected flow patterns and volume.

More particularly, the assembly of the present invention comprises a housing composed of a base housing element and an upper housing element. The base housing element is configured to be removably mounted to surround an outlet of a storage container, while the upper housing element is rotatably mounted to the base housing element. Arranged between the base and upper housing elements is a grinding element arranged to grind particles of spice as the upper housing element is rotated in respect to the base housing element. Spaced upwardly into the upper housing element, above the grinding element, is a flow grid and a rotatable flow selector, the space between the flow grid and the grinding element comprising a temporary holding area for ground spice. In the functional operation of the assembly, the storage container is inverted to allow large particulate spice in the storage container to engage the grinding element for grinding; the upper housing is rotated to activate the grinding process; ground spice flows into and/or through the temporary holding area; and the rotatable flow selector is rotated to various selected open flow positions and/or is closed to cap the assembly from dispensing ground spice from the temporary holding area. If the flow selector is in an open flow position during grinding, ground spice flows through the temporary holding area and is dispensed from the assembly in various patterns and rates of flow. If the flow selector is in a closed position during grinding, the ground spice is maintained in the temporary holding area between the grinding means and the flow grid for later dispersing.

In a preferred embodiment of the invention, the assembled housing comprises generally cylindrically walled interior sections or volumes of different diameters arranged along a central (also referred to as vertical) axis.

In the base housing element or unit, starting from the bottom to the top, a generally cylindrical interior wall surface is a first (larger) diameter bottom section having internal threads arranged to engage mating external threads arranged about an opening of the storage container, is stepped inward in diameter to a smaller diameter grinder section, this wall diameter generally being smaller than the diameter of the opening of the storage container, then stepped outward in diameter to a top section having a wall diameter somewhat larger than the grinder section wall.

In a particularly preferred embodiment, the internal surface of the smaller diameter grinder section is arranged to extend into the opening of the container when the base housing element is mounted onto the storage container and comprises a plurality of generally parallel grinder grooves along its circumference, the grinder grooves being angled from the direction of the central longitudinal axis and having generally parallel peaks therebetween. The grooves are angled such that a particle flowing from the storage compartment, which engages a groove along the internal wall of the smaller diameter grinder section, will tend to follow the groove and move circumferentially about the longitudinal axis of the base housing element as it moves in the general direction of the vertical axis. In a further preferred embodiment, a portion of the exterior surface of the base housing element is generally cylindrical and comprises an attachment slot, which generally encircles the housing element and is sized to accept a mating ridge of the upper housing element for attachment thereto.

In the upper housing element or unit the generally cylindrical interior sections or volumes are also stepped in diameter, generally from a wider diameter size arranged at the bottom of the upper housing element to matingly engage over a cylindrical exterior surface of the base housing element to a smaller diameter size comprising the temporary holding area and the flow grid toward the top of the upper housing. In a preferred embodiment, the interior wall surface of the wider interior diameter comprises an inwardly extending circumferential ridge, sized and arranged to mate with the attachment slot on the generally cylindrical exterior surface of the base housing element so as to lock the two housing elements together on assembly. Arranged between the wider interior diameter and the smaller interior diameter, is a further inwardly projecting circumferential ridge, the ridge comprising a plurality of spaced apart, longitudinally extending grinder studs arranged to engage a grinder element interposed between the upper housing element and the base housing element, in an arrangement enabling rotation of the grinder element during back and forth rotation of the upper housing.

The smaller diameter section of the upper housing element is sized to accept insertion of a circular flow grid plate and rotatable circular flow selector, spaced from the grinder element so as to form a holding area for ground spice. In a preferred embodiment, the interior surface of the smaller diameter section of the upper housing contains a plurality of spaced, vertically arranged, inwardly extending ribs and the flow grid comprises a plurality of slots spaced around its circumference arranged to mate with such ridges upon insertion of the flow grid plate in the smaller diameter section. A circumferential inwardly projecting ridge around the interior surface of the smaller diameter section is spaced from the grinder element, and the flow grid plate is sized so that the flow grid plate can be inserted into the smaller diameter section of the upper housing, flush against the circumferential ridge and will be retained by frictional engagement thereto, forming a wall of the defined holding area.

The rotatable flow selector is rotatably mounted to the flow grid plate and comprises a sized opening which can be rotated to various positions along the surface of the flow grid plate. The flow grid plate comprises one or more types of openings arranged through the grid plate, spaced around the circular plate at generally distinct areas. Thus, one distinct area of the grid plate may comprise a plurality of holes of a first diameter and an adjacent area of the grid plate a plurality of holes of a different diameter, and/or an area of the grid plate can comprise a single large opening, or have no opening. The flow selector comprises a at least one large opening and when the opening is rotated to a position of an area on the grid plate comprising a plurality of defined sized holes, it allows a restricted flow volume of fresh ground product to fall through in the defined pattern of the holes.

Similarly, the flow selector can be rotated to so that its hole is in a position comprising a plurality of different sized holes or a single large opening in the grid plate to enable different patterned flows and/or different volumes of flow. Similarly rotating the flow selector hole to an area containing no opening prevents the flow of fresh ground product therethrough.

The grinder element is arranged to rest in the top volume of the base housing element and rotate with rotation of the upper housing element. In a preferred embodiment of the invention, the grinder element comprises a generally circular grinder portion of a first diameter, sandwiched between a radially spoked open portion having a diameter greater than the grinder plate and a radially winged portion having a diameter less than the grinder portion.

The grinder portion comprises a serrated circumference, and is dimensioned in diameter such that when mounted about perpendicular to the longitudinal axis of the housing, it loosely mates with the grooved interior surface of the grinder section of the base housing element. Preferably, the diameter of the grinder plate is such that the sharply angled tips of the serrations engage the peeks between the grooves or even extend slightly into the grooves of the grinder section of the base housing element.

The radially spoked open portion is connected to and/or integral with the top side of the grinder portion, and is dimensioned so that the radial spokes fit within and can be rotated in the larger diameter of the top section of the base housing element. The spoked open portion thus supports the grinder portion in position along the longitudinal axis of the base housing and rotation of the spoked open portion, rotates the grinder portion. The spokes are sized and spaced with openings therebetween to be engaged on either side by the longitudinally extending grinder studs, arranged between the wider interior diameter and the smaller interior diameter of the upper housing. Upon assembly of the upper housing element to the base housing element, spaced studs engage opposite sides of spokes and rotating the upper housing assembly rotates the spoked open portion and the grinder portion connected therewith. Inverting the assembly and rotating the upper housing assembly causes particles of spice engaging the grinder plate between the serrated circumference and the grooved interior wall of the inner surface of the base plate to be ground, with ground spice falling through the openings in the spoked open plate.

The radially winged portion is connected to and/or integral with the side opposite the first side of the grinder portion, and comprises a plurality of curved surfaces extending spirally from the circumference thereof, to a diameter less than the diameter of the inner surface of the grinder portion of the base housing assembly. The curved surfaces are arranged such that upon rotation of the grinder portion, stored particles in the storage container are stirred outwardly toward the grooved inner surface of the grinder section to promote movement of the particles along the grooved surface toward engagement with the serrated circumference of the grinder portion.

It should be understood that each of the elements comprising the assembly can be formed from any appropriate plastic material, and that the term spice includes any suitable condiment, food or the like which may be ground, including dried fruits, nuts and the like. In a preferred embodiment, the serrations along the circumference of the grinder plate are dimensioned to extend into the grooves on the inner surface of the grinder section of the base unit such that upon rotation of the grinder unit the ends of serrations will engage peaks of the grooves in the inner surface. Such engagement provides a more consistent ground product which appears to be more desirable to the public. Generally the grinder plate and integral sandwiched components are formed from an engineering plastic such as a nylon and the like which do not wear easily when engaging the peeks of the grooves.

DETAILED DESCRIPTION OF THE INVENTION

Figure 1:
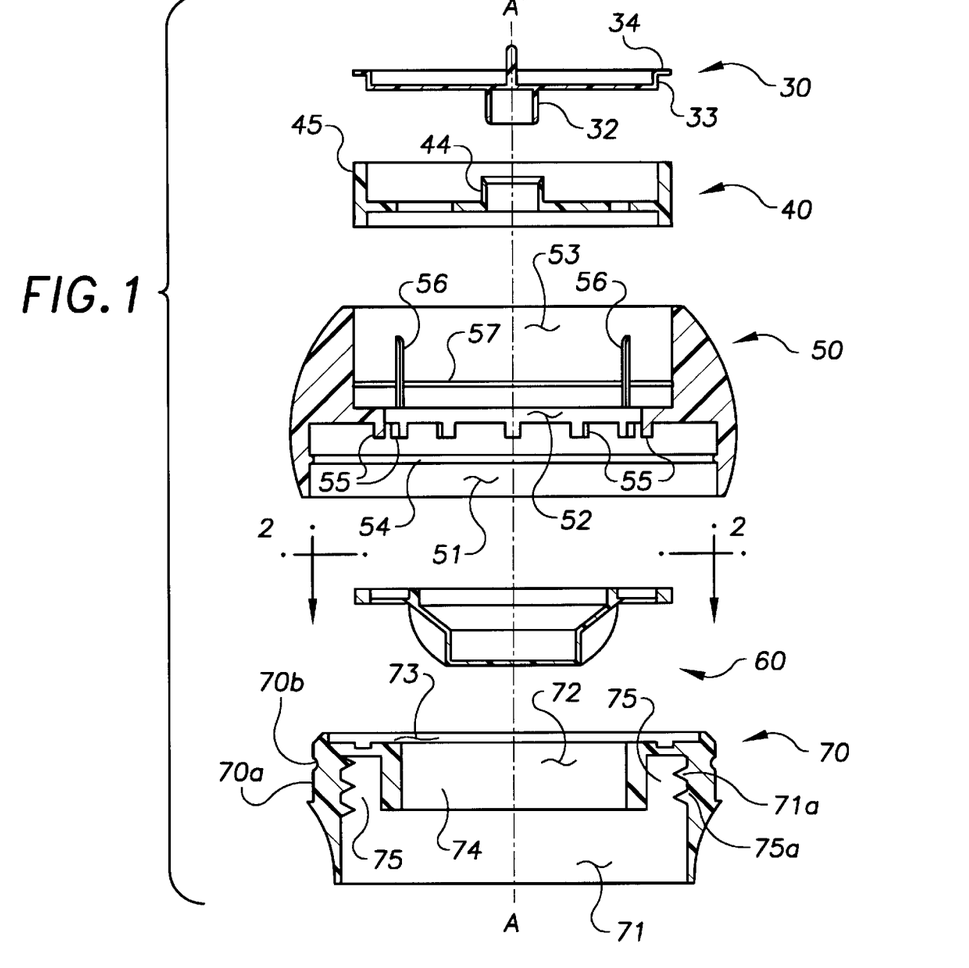
FIG. 1 is an exploded sectional view of one embodiment of the assembly of the invention.

Referring first to FIG. 1, therein is depicted a preferred embodiment of the spice grinder and dispenser assembly of the invention, starting from the bottom of the assembly as comprising a base housing element 70, grinder element 60, upper housing element 50, flow grid element 40 and flow selector element 30.

Referring now to FIGS. 1, 3, 4 and 5, therein lower base housing element 70 is depicted as comprising three generally cylindrical sections: section 71, generally referred to as the storage container attachment section, comprising a large diameter generally cylindrical volume containing threads 71*a* along its interior surface for engaging mating threads surrounding an opening of a storage container (not shown); section 72, generally referred to as the grinder section, the grinder section being a generally cylindrical volume, reduced in diameter from section 71 and having a plurality of generally parallel grooves 74 arranged along its interior surface which are angled from the direction of the central longitudinal axis A–A'; and section 73, generally referred to the grinder element support section, the grinder support section being a generally cylindrical volume having a diameter greater than the diameter of section 72, and being sized to accept and support the outer circumferential area of a radial spoked element of the grinder element. In this preferred embodiment, base housing element 70 is depicted as comprising a circular slot 75, having an outside wall 75*a* of which comprises threads 71*a*. The slot is sized to accept a threaded open neck of a storage container, which contains an opening to the interior of the storage container. In addition, lower base housing element 70 is illustrated as comprising a generally cylindrical exterior surface 70*a,* containing attachment slot 70*b,* at the perimeter thereof.

Referring now to FIGS. 1, 9, 10 and 11, therein upper housing element 50 is also depicted as comprising three generally cylindrical sections: section 51, generally referred to as the base element attachment section, comprising a large diameter generally cylindrical volume having a diameter just larger than the diameter of cylindrical surface 70*a* of lower base housing element 70 and containing a circular ridge 54 around its interior surface sized and arranged to engage in attachment slot 70*b* of lower base housing element 70 for attachment of the upper housing element to the lower base housing element; section 52, generally referred to as the grinder activating section, the grinder activating section being a generally cylindrical volume, reduced in diameter from section 51 and having a plurality of spaced apart, longitudinally extending grinder studs 55, the grinder studs being arranged to engage on opposite sides of spokes comprised in the spoked element of the grinder element; and section 53, generally referred to as the ground spice holding and dispensing section, having a generally cylindrical volume reduced in diameter from section 51, and containing a plurality of spaced apart, longitudinally arranged inwardly extending ribs 56 and an inwardly projecting circumferential ridge 57. In the preferred embodiment the diameter of section 52 of upper housing element 50 is smaller than the diameter of section 73 of lower base housing element 70.

Referring now to FIGS. 1, 2, 6, 7 and 8, therein grinding element 60 is depicted as comprising three generally cylindrical sections: a generally circular grinder plate section 61 of a first diameter; a radially spoked open plate section 62 having a diameter greater than the grinder plate section; and a radially winged section 63 having a diameter less than grinder plate 61.

Figure 2:
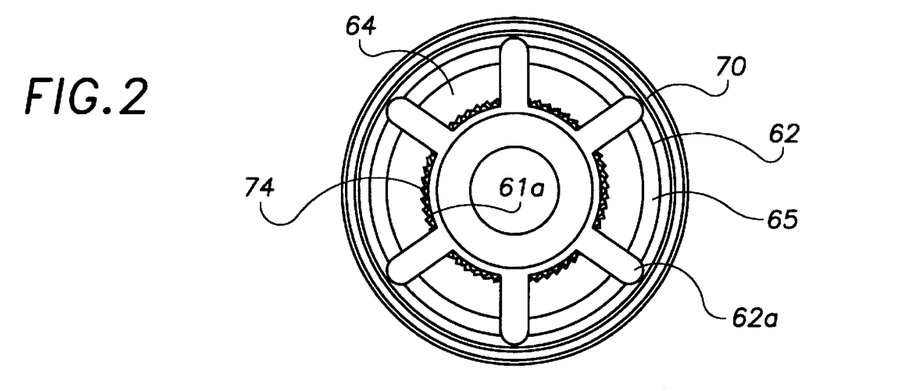
FIG. 2 is a top plan view taken along about line 2–2' of FIG. 1.
Figure 3:
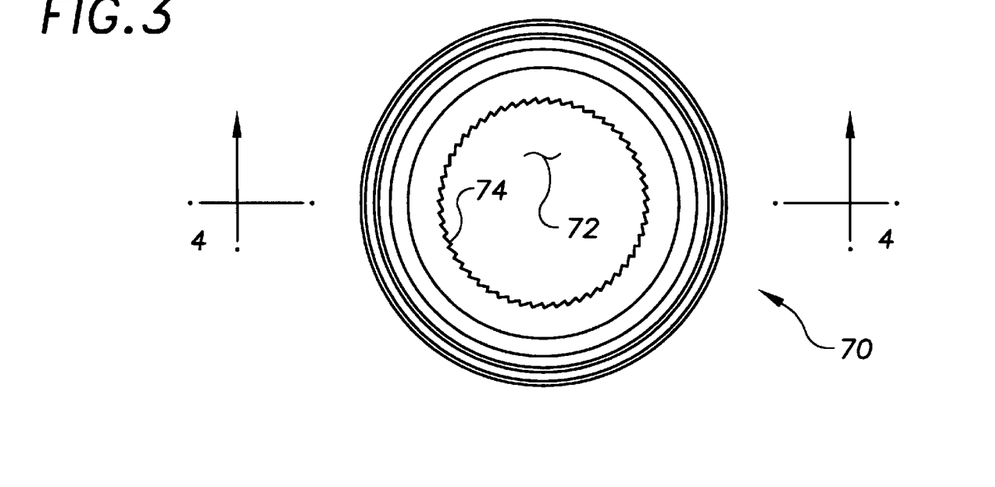
FIG. 3 is a top plan view of the base housing element of FIG. 1.
Figure 4:
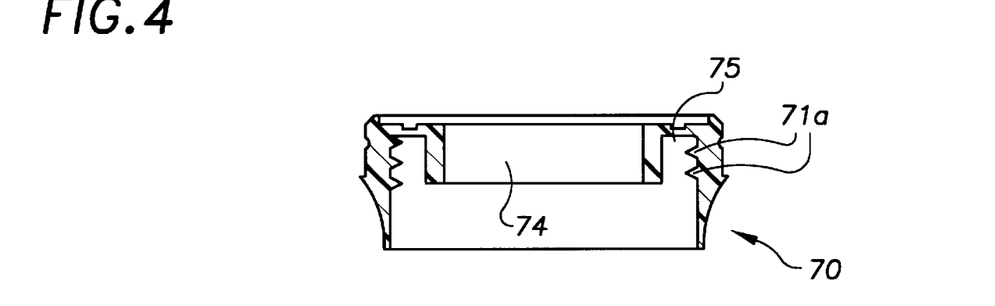
FIG. 4 is a sectional view taken along about line 4–4' of FIG. 3.
Figure 5:
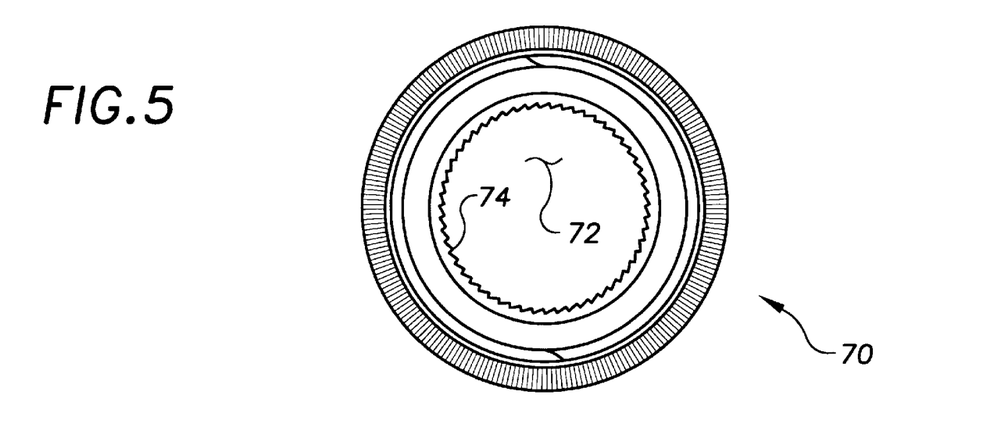
FIG. 5 is a bottom plan view of the base housing element of FIG. 1.
Figure 6:
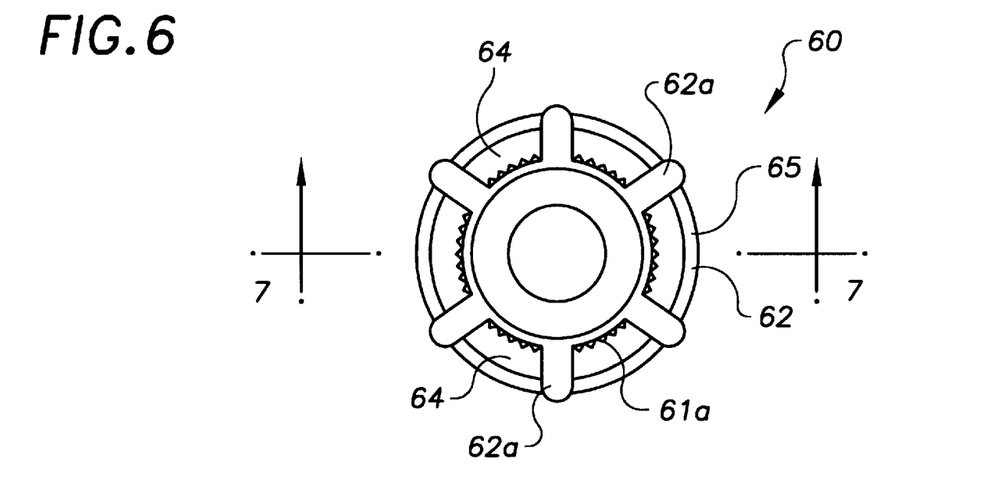
FIG. 6 is a top plan view of the grinding element of FIG. 1.
Figure 7:
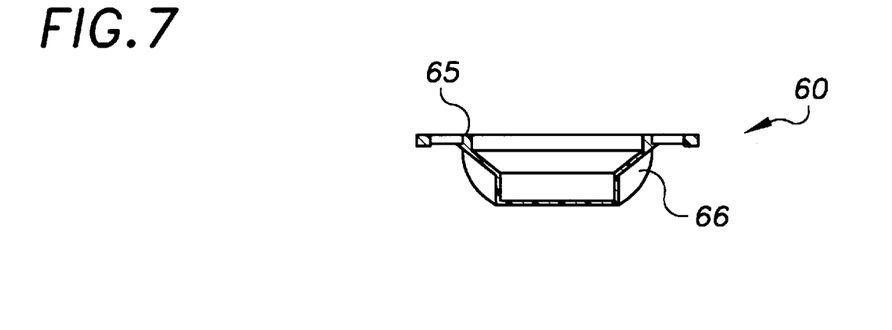
FIG. 7 is a sectional view taken along about line 7–7' of FIG. 6.
Figure 8:
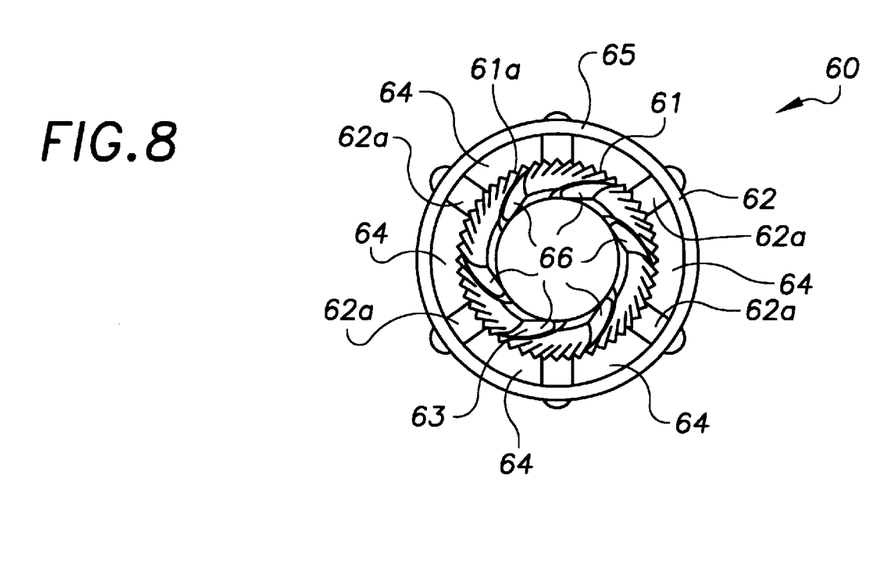
FIG. 8 is a bottom plan view of the grinding element of FIG. 1.
Figure 9:
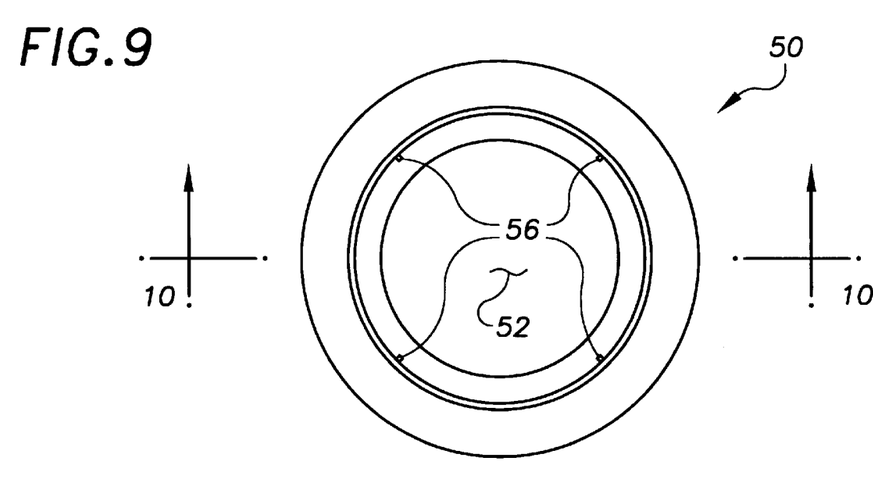
FIG. 9 is a top plan view of the upper housing element of FIG. 1.
Figure 10:
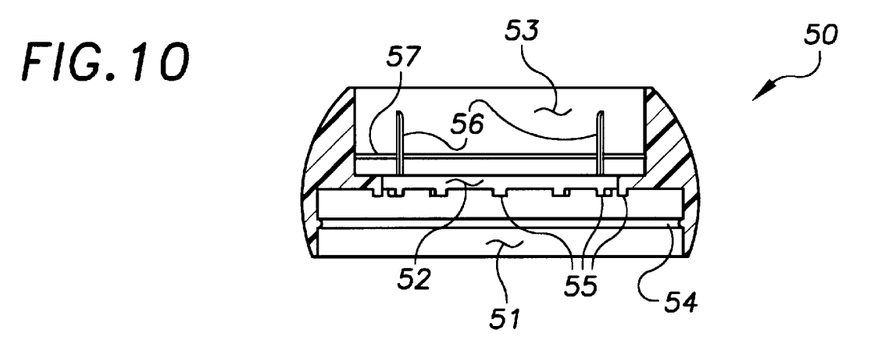
FIG. 10 is a sectional view taken along about line 10–10' of FIG. 9.
Figure 11:
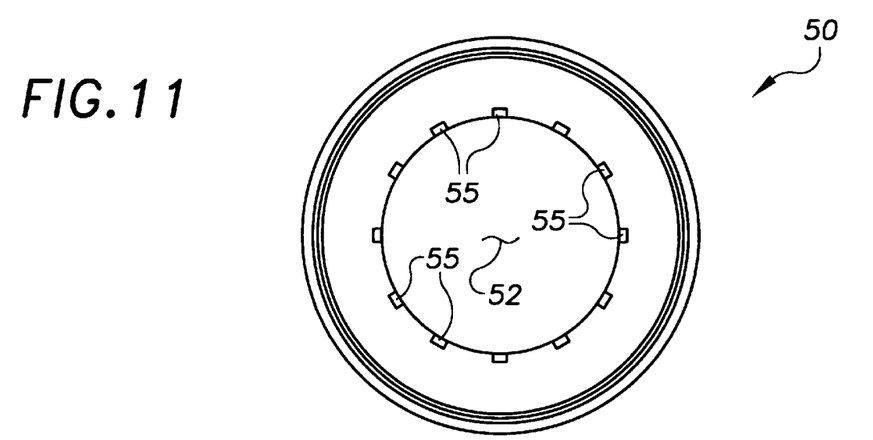
FIG. 11 is a bottom plan view of the grinding element of FIG. 1.
Figure 12:
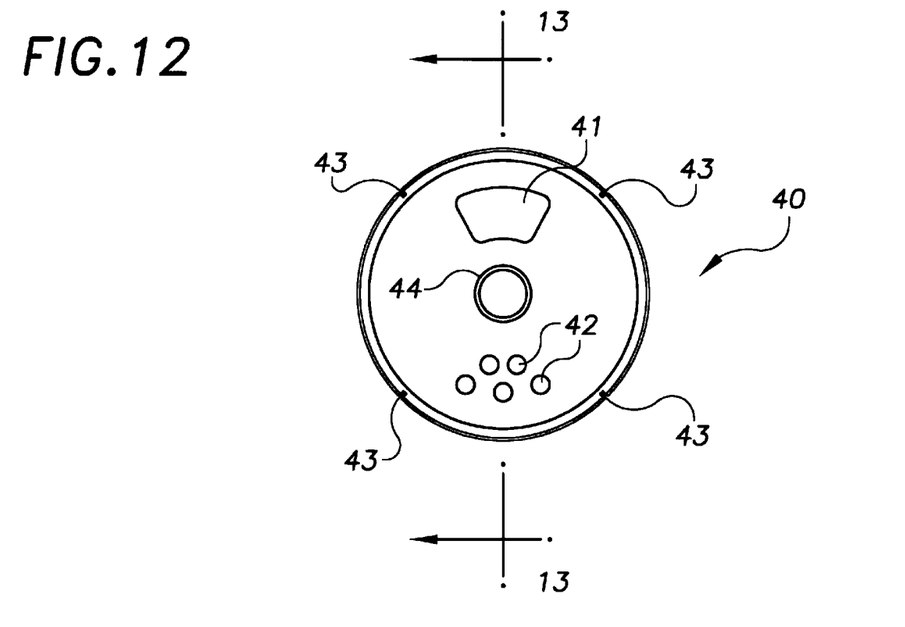
FIG. 12 is a top plan view of the flow grid element of FIG. 1.
Figure 13:
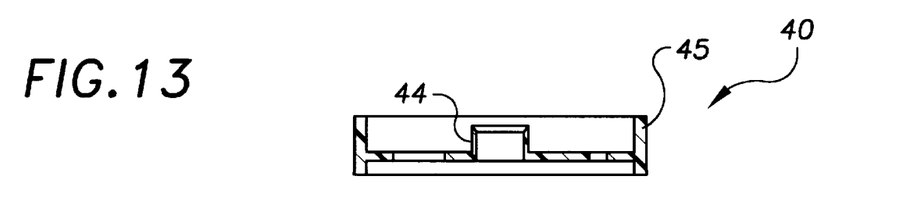
FIG. 13 is a sectional view taken along about line 13–13' of FIG. 12.
Figure 14:
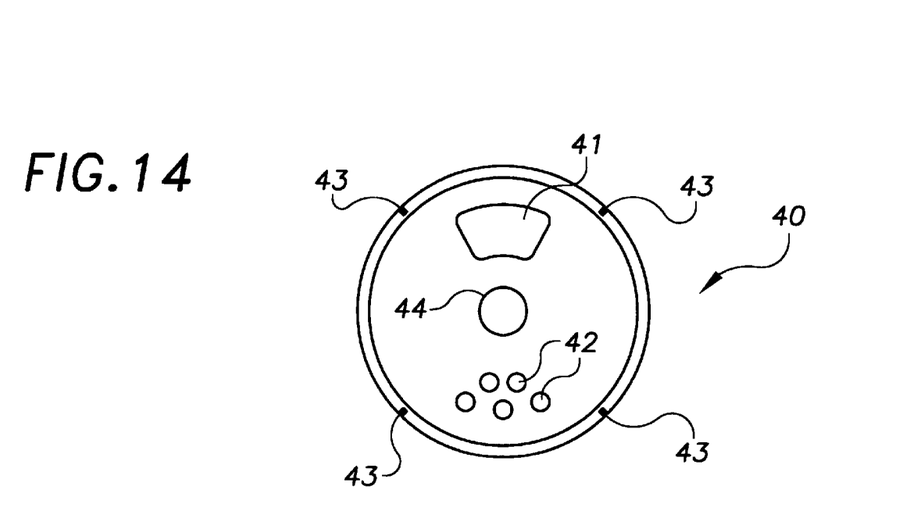
FIG. 14 is a bottom plan view of the flow grid element of FIG. 1.
Figure 15:
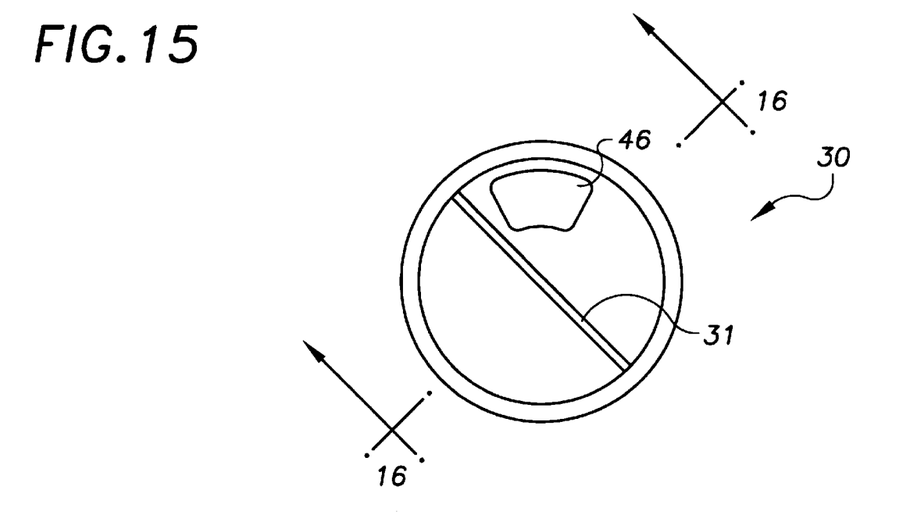
FIG. 15 is a top plan view of the flow selector element of FIG. 1.
Figure 16:
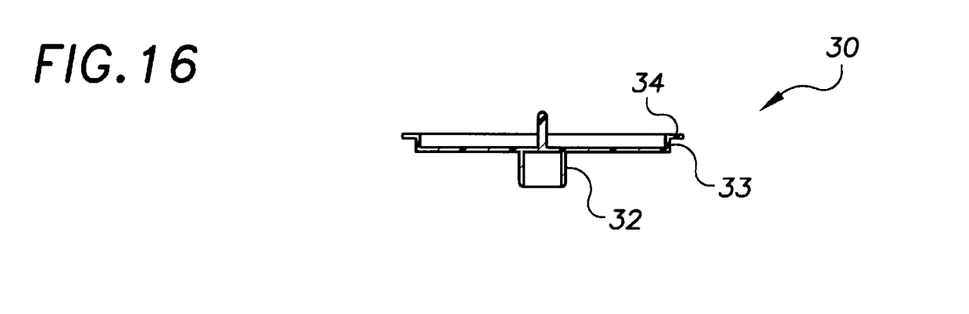
FIG. 16 is a sectional view taken along about line 16–16' of FIG. 15.
Figure 17:
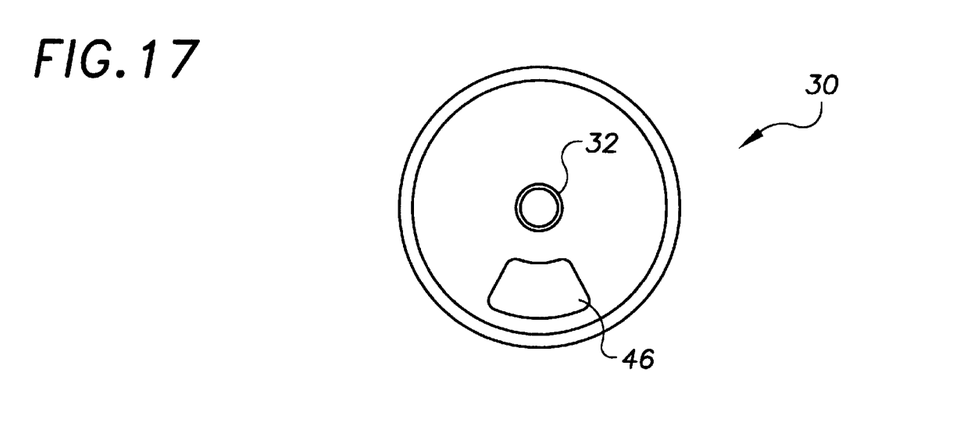
FIG. 17 is a bottom plan view of the flow selector element of FIG. 1.

Grinder plate section 61 comprises a serrated circumference 61*a,* which is dimensioned in diameter such that when this section is mounted on the base housing element, so that it is about perpendicular to the longitudinal axis of the base housing element, it loosely mates with the grooved interior surface of the grinder section of the base housing element as illustrated in FIG. 2.

Radially spoked section 62 comprises a plurality of radial spokes 62*a* having openings 64 therebetween and a circumferential ring 65 which maintains the structural integrity of the spokes. Radial spokes 62*a* are sized and spaced with openings therebetween to be engaged on either side by the longitudinally extending grinder studs 55 of upper housing element 50, so that upon assembly of the upper housing element to the base housing element containing the grinder element, spaced studs 55 engage opposite sides of spokes, and inverting the assembly and rotating the upper housing assembly causes particles of spice engaging the grinder plate between the serrated circumference and the grooved interior wall of the inner surface of the base plate to be ground, with ground spice falling through the openings in the spoked open plate.

Radially winged section 63 comprises a plurality of spaced curved wings 66, which angularly extend from the circumference thereof. The curved wings are arranged such that upon inverting the assembly and rotating the grinder plate, particles flowing from the storage container will be stirred toward the grooved inner surface of the grinder section to promote movement of the particles along the grooved surface toward engagement with the serrated circumference of the grinder plate.

Referring now to FIGS. 1, 12, 13 and 14, therein flow grid plate 40 is illustrated as comprise a generally polygonal opening 41, a plurality of generally circular openings 42 arranged in opposite sectors of the grid plate and a solid plate arrangement in adjacent sectors. The circumference of grid plate 40 comprises a longitudinally extending wall 45 and four slots 43, spaced thereabout, being spaced to mate with four longitudinally arranged inwardly extending ribs 56 of upper housing element 50, so as to enable insertion of grid plate 40 into section 53 of the upper housing element with frictional fit to resist rotation and removal. Hub 44 is illustrated as comprising a cylindrical opening about the longitudinal centerline of the assembly, arranged for engaging a mating closed cylindrical hub of a rotatable flow selector.

Referring now to FIGS. 1, 15, 16 and 17, therein rotatable flow selector 30 is illustrated as comprising a dished plate, having a cross shoulder 31 arranged on a top side and a closed cylindrical hub 32 on the underside. Cylindrical hub 32 is sized and dimensioned to insert into hub 44 and extend through grid plate 40, it being contemplated that upon assembly of the flow selector to the grid plate the end will be rounded, deformed or the like to resist disassembly, while enabling rotation of the selector relative to the grid plate. In the preferred illustrated embodiment, the dished circumferential wall 33 of the flow selector comprises a circumferential ridge 34, which is sized to engage the interior surface of wall 45 of the grid plate, and maintain the full surface of circumferential wall 33 from engaging the interior surface of wall 45. Flow selector 30 comprises a single polygonal opening 46 therein, which generally conforms in size and shape to opening 41 of the grid plate and generally surrounds about a portion of the array of openings 42, so as to enable rotation of the flow selector to a point opposite the single opening 41 of the grid plate, or a point opposite the array of openings 42 or to a non-opening containing section of the grid plate. It should be understood that when positioned at the non-opening containing section of the grid plate, spices or the like can be ground and will accumulate in the holding area between the grinder element and the grid plate spaced therebetween for later dispensing. Significantly, even when the assembly is turned to its non-inverted position, the close engagement of the serrated circumference of the grinder element with the grinder section of the base housing element, resists the flow of ground spices and the like back into the storage container.

Figure 18:
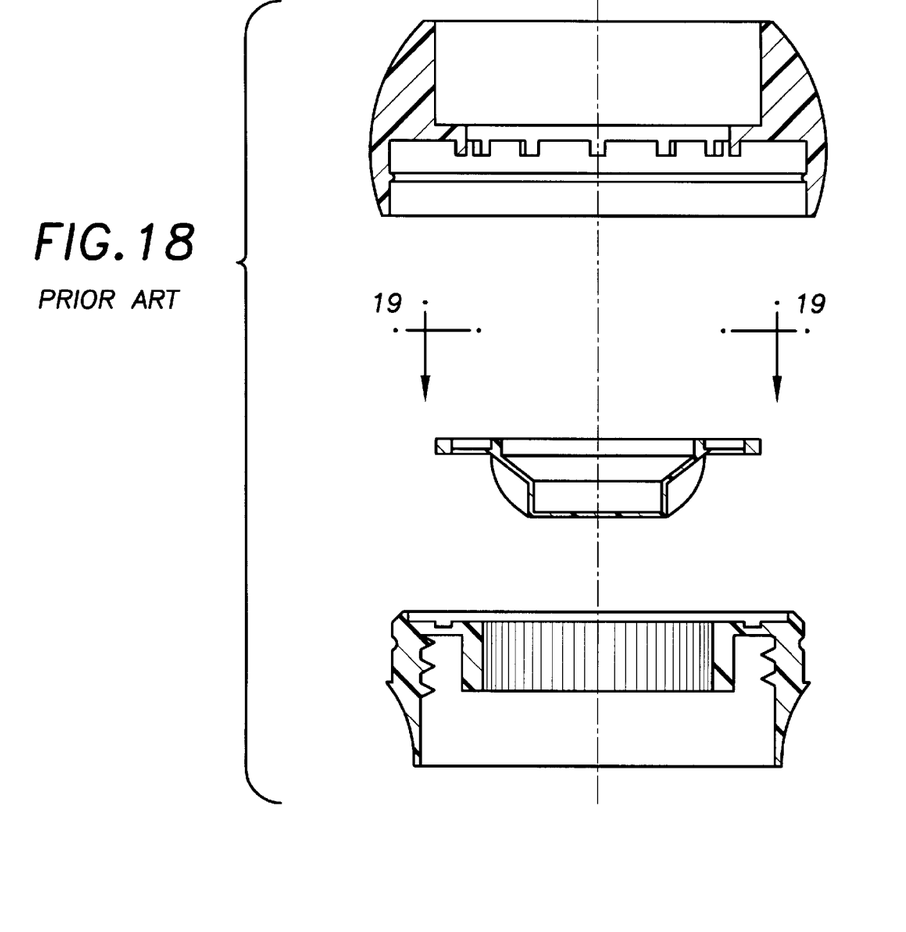
FIG. 18 is an exploded sectional view of a prior art embodiment of a grinding assembly.
Figure 19:
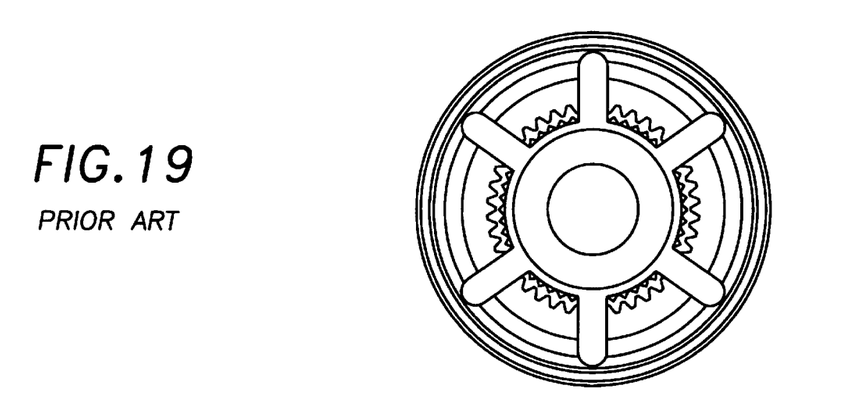
FIG. 19 is a top plan view taken along about line 19–19' of FIG. 18.

Referring now to FIGS. 18 and 19 identifying a grinder assembly of the prior art. Therein it is noted that no grid plate or rotatable flow selector is disclosed, no ribs are disclosed for the assembly thereof to an upper housing element, grooves in a lower housing element are generally parallel to the longitudinal axis of the assembly and notched edges of the grinder element are arranged so that they are significantly spaced from the grooves of the lower housing element upon assembly.

I claim:

1. A grinder and dispensing assembly comprising:

a housing, having a base housing element, a grinder element, an upper housing element and a flow selector element arranged seriatim along a centerline;

said upper housing element being rotatably mounted to said base housing element and said base housing element being arranged to be mounted surrounding an opening of a storage container;

said grinder element having a generally circular serrated circumference and being mounted in a generally cylindrical walled grinder section of said base housing element, between said base housing element and said upper housing element, arranged to rotate with rotation of said upper housing element;

said flow selector element being mounted in a generally cylindrical walled section of said upper housing element spaced from said grinder element and comprises a flow plate having a plurality of spaced openings therethrough and a rotatable flow selector having an opening therethrough;

wherein said generally cylindrical wall of said grinder section has a plurality of generally parallel grooves arranged at an angle to said centerline to form peaks between said grooves, said peaks are arranged to engage said serrated circumference of said grinder element, and said flow plate is mounted in said upper housing element so as to prevent rotation thereof when said flow selector is rotated.

2. The assembly of claim 1 wherein said generally cylindrical walled section of said upper housing element comprises a plurality of ribs arranged about longitudinally around said generally cylindrical wall to engage mating slots arranged along the periphery of said flow plate.

3. The assembly of claim 1 wherein said flow plate, comprises a plurality of generally circular openings arranged in a sector of the plate.

4. The assembly of claim 1 wherein said flow plate, comprises a polygonal opening arranged in a sector of the plate.

5. The assembly of claim 1 wherein said flow selector comprises a plate, having a polygonal opening arranged in a sector of the plate.

6. The assembly of claim 5 wherein said flow selector is mounted to rotate about the centerline of said flow plate.

7. The assembly of claim 6 wherein said flow selector can be rotated to a position which prevents the flow of particles through said flow plate.

8. The assembly of claim 1 wherein said base unit comprises a generally cylindrical walled attachment section comprising threads for removable mounting to a mating threaded shoulder surrounding an opening to a storage container.

* * * * *